(12) United States Patent
Chien et al.

(10) Patent No.: US 11,530,916 B1
(45) Date of Patent: Dec. 20, 2022

(54) ELECTROMAGNETIC ANGLE SENSING STRUCTURE

(71) Applicants: Shih Hsiang Chien, Changhua County (TW); Chia Hsun Huang, Changhua County (TW); Mu-Tsan Yu, Changhua County (TW)

(72) Inventors: Shih Hsiang Chien, Changhua County (TW); Chia Hsun Huang, Changhua County (TW); Mu-Tsan Yu, Changhua County (TW)

(73) Assignee: PEACEFUL THRIVING ENTERPRISE CO., LTD., Changhua County (TW)

( * ) Notice: Subject to any disclaimer, the term of this patent is extended or adjusted under 35 U.S.C. 154(b) by 25 days.

(21) Appl. No.: 17/397,827

(22) Filed: Aug. 9, 2021

(51) Int. Cl.
*G01C 9/06* (2006.01)
*G01C 9/10* (2006.01)

(52) U.S. Cl.
CPC ............... *G01C 9/06* (2013.01); *G01C 9/10* (2013.01); *G01C 2009/064* (2013.01); *G01C 2009/107* (2013.01)

(58) Field of Classification Search
CPC .................................. G01C 9/06; G01C 9/10
USPC ............................. 33/366.11, 366.25, 366.26
See application file for complete search history.

(56) References Cited

U.S. PATENT DOCUMENTS

| | | | | |
|---|---|---|---|---|
| 4,450,353 A * | 5/1984 | Sjolund | ............. | G01C 9/06 33/366.16 |
| 4,587,741 A * | 5/1986 | Rorden | ............. | G01C 9/06 33/366.12 |
| 4,747,216 A * | 5/1988 | Kelly | ............. | G01C 9/06 340/689 |
| 4,866,850 A * | 9/1989 | Kelly | ............. | G01C 9/10 340/689 |
| 5,450,676 A * | 9/1995 | Thornsberry | ............. | G01C 9/06 33/366.16 |
| 6,115,929 A * | 9/2000 | Tanazawa | ............. | G01C 9/10 33/366.24 |
| 6,543,147 B2 * | 4/2003 | Akieda | ............. | G01C 9/12 340/440 |
| 6,708,416 B1 * | 3/2004 | Havens | ............. | G01C 9/10 33/366.23 |
| 6,725,554 B1 * | 4/2004 | Gersak | ............. | G01C 9/20 33/366.11 |

(Continued)

*Primary Examiner* — George B Bennett
(74) *Attorney, Agent, or Firm* — Che-Yang Chen; Law Office of Michael Chen

(57) ABSTRACT

An electromagnetic angle sensing structure comprises a front cover with a display module electrically connected to a control circuit with a sensing module provided with a sensing area formed by at least one sensing coil, the circuit comprises a sensing control unit generating an electromagnetic variable quantity and a central processing module receiving the variable quantity and storing an angle data; and an inner assembly body with a front side formed with a curvature guide rail, being filled with a liquid and disposed with a metal ball displacing in the guide rail, an electromagnetic field generated by the coil generates changes in an inductance value due to the ball passing through, the sensing control unit generates the variable quantity being transmitted to the central processing module, an angle information converted by the central processing module through the variable quantity and the angle data is displayed on the display module.

11 Claims, 9 Drawing Sheets

(56) References Cited

U.S. PATENT DOCUMENTS

| | | | |
|---|---|---|---|
| 6,826,844 B2* | 12/2004 | Endo | G01C 9/10 |
| | | | 33/391 |
| 7,612,877 B2* | 11/2009 | Lin | G01C 9/10 |
| | | | 356/139.1 |
| 7,937,846 B2* | 5/2011 | Ozawa | G01C 9/02 |
| | | | 33/366.26 |
| 9,146,104 B2* | 9/2015 | Smith | G01C 9/10 |
| 9,766,306 B2* | 9/2017 | Distler | G01R 33/28 |
| 10,088,311 B2* | 10/2018 | Eskew | G01C 9/18 |
| 10,502,756 B2* | 12/2019 | Yee | B01L 3/502784 |
| 11,036,309 B2* | 6/2021 | Geiger | G06F 3/0312 |
| 11,340,064 B2* | 5/2022 | Kasemsadeh | G01C 9/06 |
| 2007/0180719 A1* | 8/2007 | Donnelly | B60S 9/02 |
| | | | 33/366.11 |
| 2022/0003547 A1* | 1/2022 | Srinivasan | G01C 9/00 |

* cited by examiner

ELECTROMAGNETIC ANGLE SENSING STRUCTURE

BACKGROUND OF THE INVENTION

Field of Invention

The invention relates to an angle sensing structure, and more particularly to an electromagnetic angle sensing structure capable of directly displaying a converted value with high precision and not being affected by temperature.

Related Art

In the general civil engineering, construction, ironwork and decoration construction, it is often required to carry out level measurement to mark the horizontal position of the place to be measured. Therefore, angle detector is a commonly used instrument in construction and decoration engineering, and the main and most common technology currently is bubble level. When the bubble level is in use, measuring is mainly done by construction personnel by visual observation; however, fine adjustment by hand with visual observation are difficult to achieve accurate measurement. In addition, there are also many use acceleration sensor to measure level, and the sensing of acceleration sensor mainly uses the sensing of MEMS G-sensor to perform trigonometric operation. Although the acceleration sensor can achieve the advantage of low costs with a lower cost sensor, its sensor is susceptible to drift due to temperature influence, which will lead to inaccurate position output. In order to solve the problem of temperature influence, independent temperature compensation needs to be carried out for each product, which is even more difficult for production operations and procedures.

Therefore, the inventor of the invention and relevant manufacturers engaged in this industry are eager to research and make improvement to solve the above-mentioned problems and drawbacks in the prior art.

SUMMARY OF THE INVENTION

Therefore, in order to effectively solve the above-mentioned problems, a main object of the invention is to provide an electromagnetic angle sensing structure capable of directly displaying a converted value with high precision and not being affected by temperature.

In order to achieve the above object, the invention provides an electromagnetic angle sensing structure comprising a front cover, the front cover has a display through hole and a display module is disposed at a position of the display through hole, the display module is electrically connected to a control circuit with a sensing module, the sensing module is provided with a sensing area formed by at least one sensing coil, the control circuit comprises a sensing control unit capable of generating an electromagnetic variable quantity and a central processing module that receives the electromagnetic variable quantity, the central processing module stores an angle data; an inner assembly body, a front side of the inner assembly body is formed with a curvature guide rail with a shape the same as that of the sensing area, the curvature guide rail is filled with a liquid and disposed with a metal ball, and an inner plate is provided on the front side of the inner assembly body to shield the curvature guide rail, so that when the metal ball is displaced in the curvature guide rail, an electromagnetic field generated by the sensing coil generates changes in an inductance value due to the metal ball passing through, the sensing control unit generates the electromagnetic variable quantity through changes in the inductance value and transmits the electromagnetic variable quantity to the central processing module, and an angle information converted by the central processing module through the electromagnetic variable quantity and the angle data is displayed on the display module; and a rear cover, the rear cover and the front cover are assembled with each other, and the inner assembly body is disposed in the rear cover.

According to one embodiment of the electromagnetic angle sensing structure of the invention, further comprising a button module, the button module is disposed in the front cover and electrically connected to the control circuit, and the front cover is formed with at least one button through hole at a position of the button module to communicate with the button module.

According to one embodiment of the electromagnetic angle sensing structure of the invention, further comprising a power module, the power module is disposed in the rear cover and electrically connected to the control circuit.

According to one embodiment of the electromagnetic angle sensing structure of the invention, further comprising a liquid injection passage, the liquid injection passage is formed on the inner assembly body and communicated with the curvature guide rail.

According to one embodiment of the electromagnetic angle sensing structure of the invention, further comprising a liquid injection hole, the liquid injection hole is formed on the inner plate and communicated with the liquid injection passage.

According to one embodiment of the electromagnetic angle sensing structure of the invention, further comprising a leak-proof element, the leak-proof element is assembled with the liquid injection hole and seals the liquid injection hole.

According to one embodiment of the electromagnetic angle sensing structure of the invention, further comprising a sealing passage, the sealing passage is formed on the front side of the inner assembly body, and a sealing member is disposed in the sealing passage to attach on the inner plate.

According to one embodiment of the electromagnetic angle sensing structure of the invention, wherein the angle data comprises a plurality of test angle values and a plurality of test electromagnetic quantity values corresponding to one another, the central processing module obtains the corresponding test angle value by comparing the electromagnetic variable quantity with the test electromagnetic quantity values, and the central processing module converts the test angle value into the angle information and displays the angle information on the display module.

According to one embodiment of the electromagnetic angle sensing structure of the invention, wherein the angle data further comprises an angle relation, and the angle information calculated through the electromagnetic variable quantity received by the central processing module by using the angle relation is displayed on the display module.

According to one embodiment of the electromagnetic angle sensing structure of the invention, wherein the angle data comprises a plurality of coil angle values, a plurality of interpolated angle values, and a position relation.

According to one embodiment of the electromagnetic angle sensing structure of the invention, further comprising at least one assembling hole, the assembling hole is formed on the front side of the inner assembly body, at least one plate through hole is formed on the inner plate to communicate with the assembling hole, and the plate through hole and the assembling hole are locked with each other by at least one locking element.

DETAILED DESCRIPTION OF THE INVENTION

The above-mentioned object of the invention and its structural and functional features will be described based on the preferred embodiments with reference to the accompanying drawings.

In the following, for the formation and technical content related to an electromagnetic angle sensing structure in the invention, various applicable examples are exemplified and explained in detail with reference to the accompanying drawings; however, the invention is of course not limited to the enumerated embodiments, drawings, or detailed descriptions.

Furthermore, those who are familiar with this technology should also understand that the enumerated embodiments and accompanying drawings are only for reference and explanation, and are not used to limit the invention; other modifications or alterations that can be easily implemented based on the detailed descriptions of the invention are also deemed to be within the scope without departing from the spirit or intention thereof as defined by the appended claims and their legal equivalents.

Furthermore, the directional terms mentioned in the following embodiments, for example: "above", "below", "left", "right", "front", "rear", etc., are only directions referring in the accompanying drawings. Therefore, the directional terms are used to illustrate rather than limit the invention. In addition, in the following embodiments, the same or similar elements will be labeled with the same or similar numerals.

Figure 1:
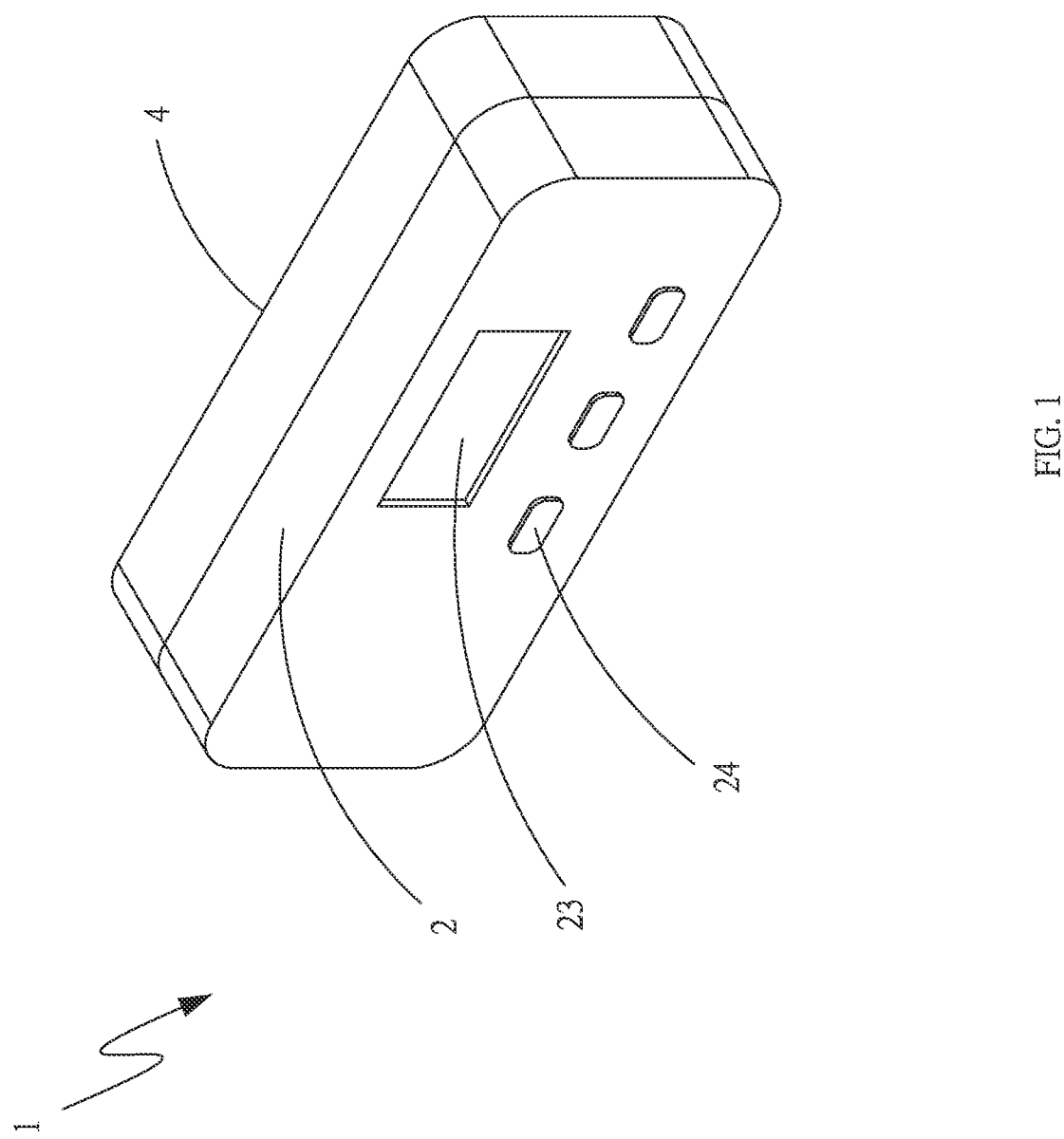
FIG. 1 is a perspective assembly view of an electromagnetic angle sensing structure of the invention.
Figure 2:
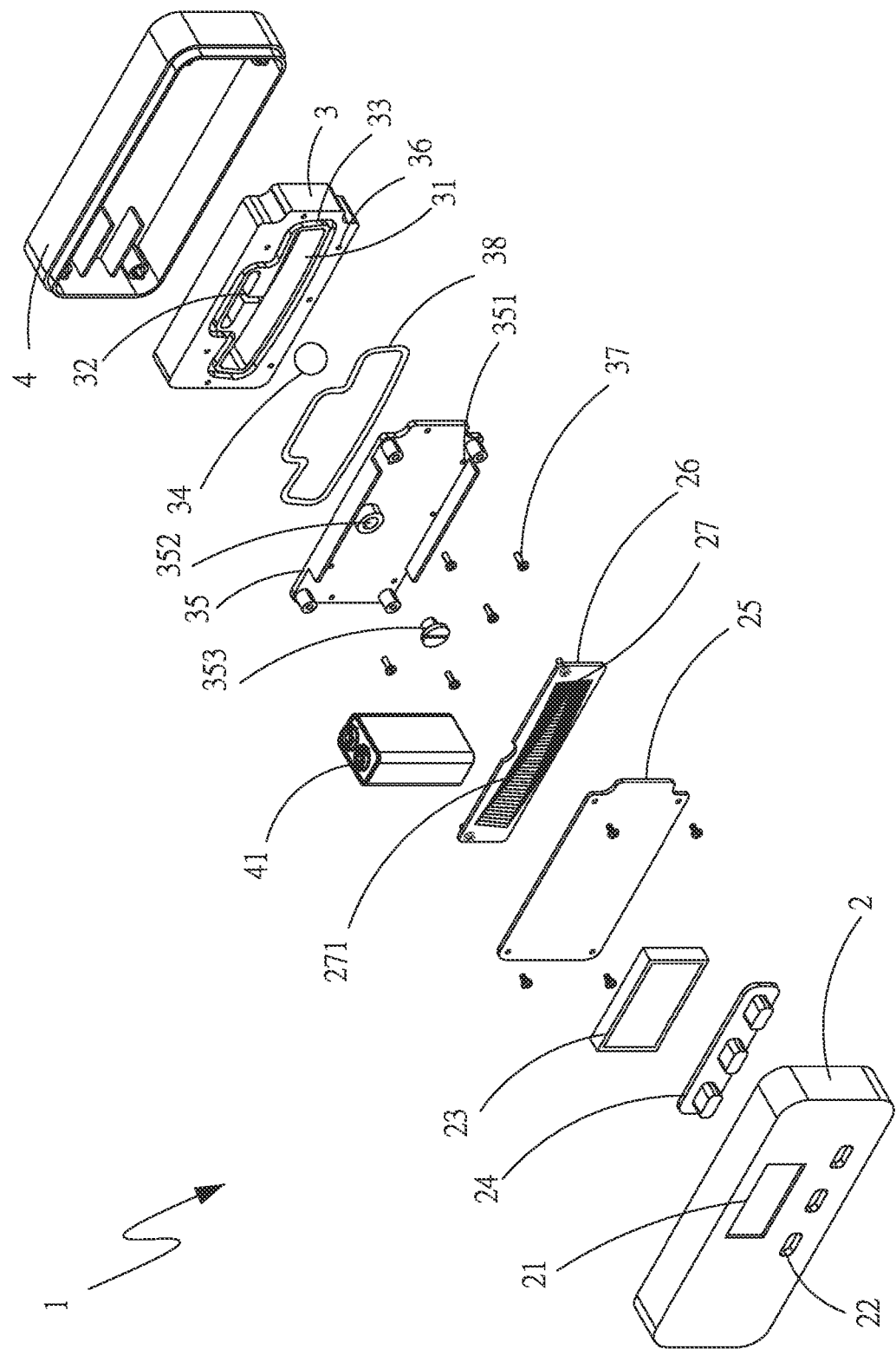
FIG. 2 is a perspective exploded view of the electromagnetic angle sensing structure of the invention.
Figure 3:
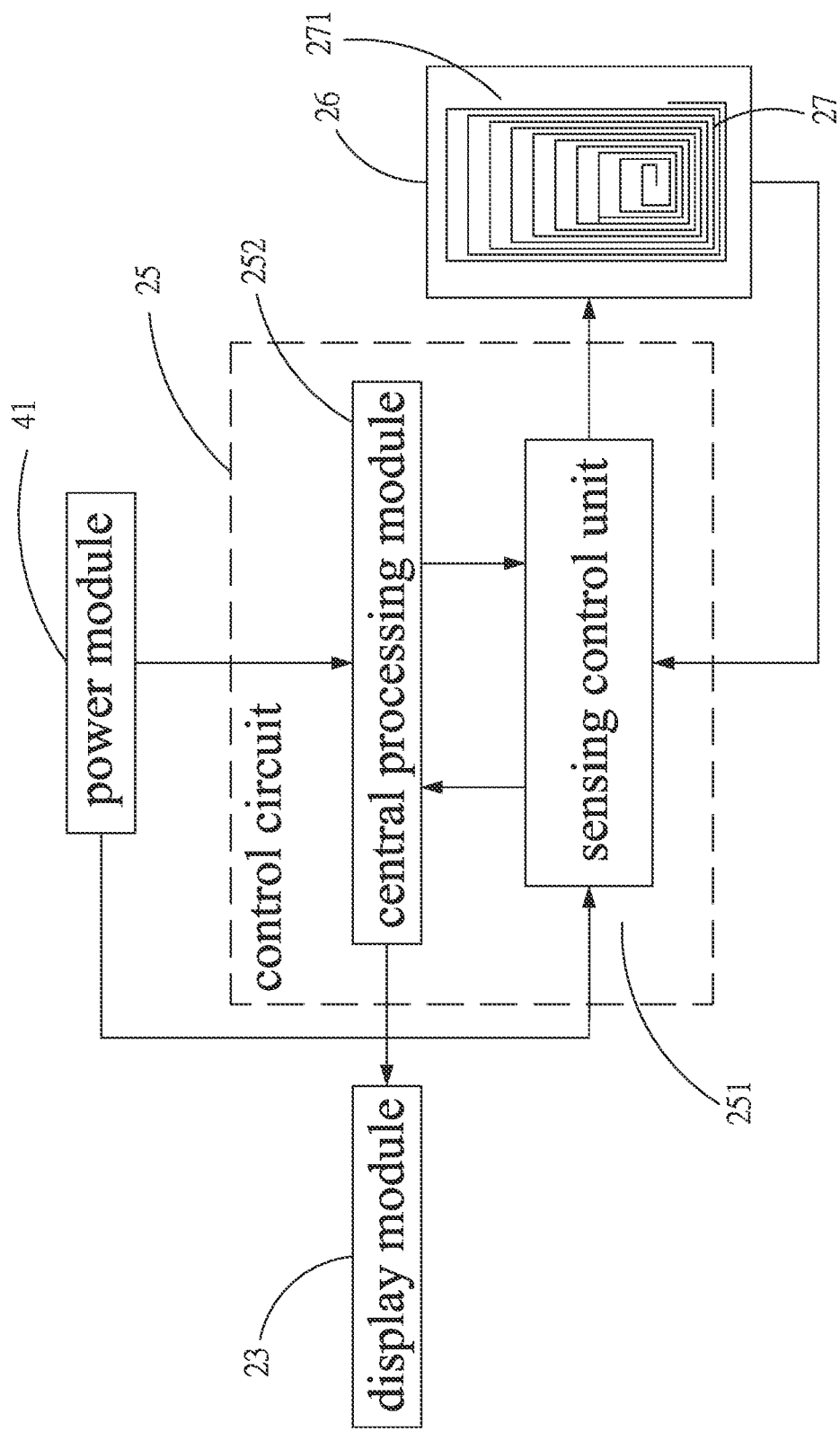
FIG. 3 is a first partial block diagram of the electromagnetic angle sensing structure of the invention.

First of all, please refer to FIGS. 1, 2 and 3 respectively for a perspective assembly view, a perspective exploded view, and a first partial block diagram of an electromagnetic angle sensing structure 1 of the invention. It can be clearly seen from the figures that the electromagnetic angle sensing structure 1 comprises a front cover 2, an inner assembly body 3, and a rear cover 4.

Wherein the front cover 2 has at least one display through hole 21 and at least one button through hole 22, inside the front cover 2 is provided with a display module 23 and a button module 24, and inside the front cover 2 is further provided with a control circuit 25. The control circuit 25 is electrically connected to the display module 23 and the button module 24, the control circuit 25 is electrically connected with a sensing module 26, the sensing module 26 can be disposed on the control circuit 25, or can also be electrically connected to the control circuit 25 with an electric wire, and the sensing module 26 is provided with at least one sensing coil 27. In this embodiment, the sensing module 26 is provided with the single sensing coil 27, the sensing module 26 is defined by the sensing coil 27 to form a sensing area 271, the sensing coil 27 is formed in a curvature trajectory manner, and the sensing area 271 is caused to present in a curvature trajectory manner. The control circuit 25 comprises a sensing control unit 251 and a central processing module 252, the central processing module 252 stores an angle data, the angle data comprises a plurality of test angle values and a plurality of test electromagnetic quantity values corresponding to one another, and the angle data further has an angle relation calculated from the test angle values and the test electromagnetic quantity values.

Wherein the inner assembly body 3 is disposed at a position on a rear side of the sensing module 26, and a front side of the inner assembly body 3 is formed with a curvature guide rail 31, a liquid injection passage 32, and a sealing passage 33, wherein the curvature guide rail 31 is an arcuate guide rail, and a curvature trajectory formed by the curvature guide rail 31 is the same as that of the sensing area 271. The inner assembly body 3 is filled with a liquid in the curvature guide rail 31 and is provided with a metal ball 34. The liquid injection passage 32 communicates with the curvature guide rail 31, the inner assembly body 3 is provided with an inner plate 35 at a position of the front side, and the inner assembly body 3 is provided with a plurality of assembling holes 36 communicating with plate through holes 351 of the inner plate 35, and the plate through holes 351 and the assembling holes 36 are locked with one another by a plurality of locking elements 37, so that the inner plate 35 is fixedly assembled on the front side of the inner assembly body 3. The sealing passage 33 is formed on the front side of the inner assembly body 3, a sealing member 38 is provided in the sealing passage 33 to attach on the inner plate 35, the inner plate 35 is further formed with a liquid injection hole 352, and the liquid injection hole 352 is formed on the inner plate 35 to communicate with the liquid injection passage 32. The inner plate 35 is further provided with a leak-proof element 353, and the leak-proof element 353 is assembled with the liquid injection hole 352 and seals the liquid injection hole 352.

Wherein the rear cover 4 and the front cover 2 are assembled with each other, the inner assembly body 3 is disposed in the rear cover 4, inside the rear cover 4 is further provided with a power module 41, the power module 41 can be a battery, and the power module 41 is correspondingly disposed on a side of the inner assembly body 3 and electrically connected to the control circuit 25.

Figure 4:
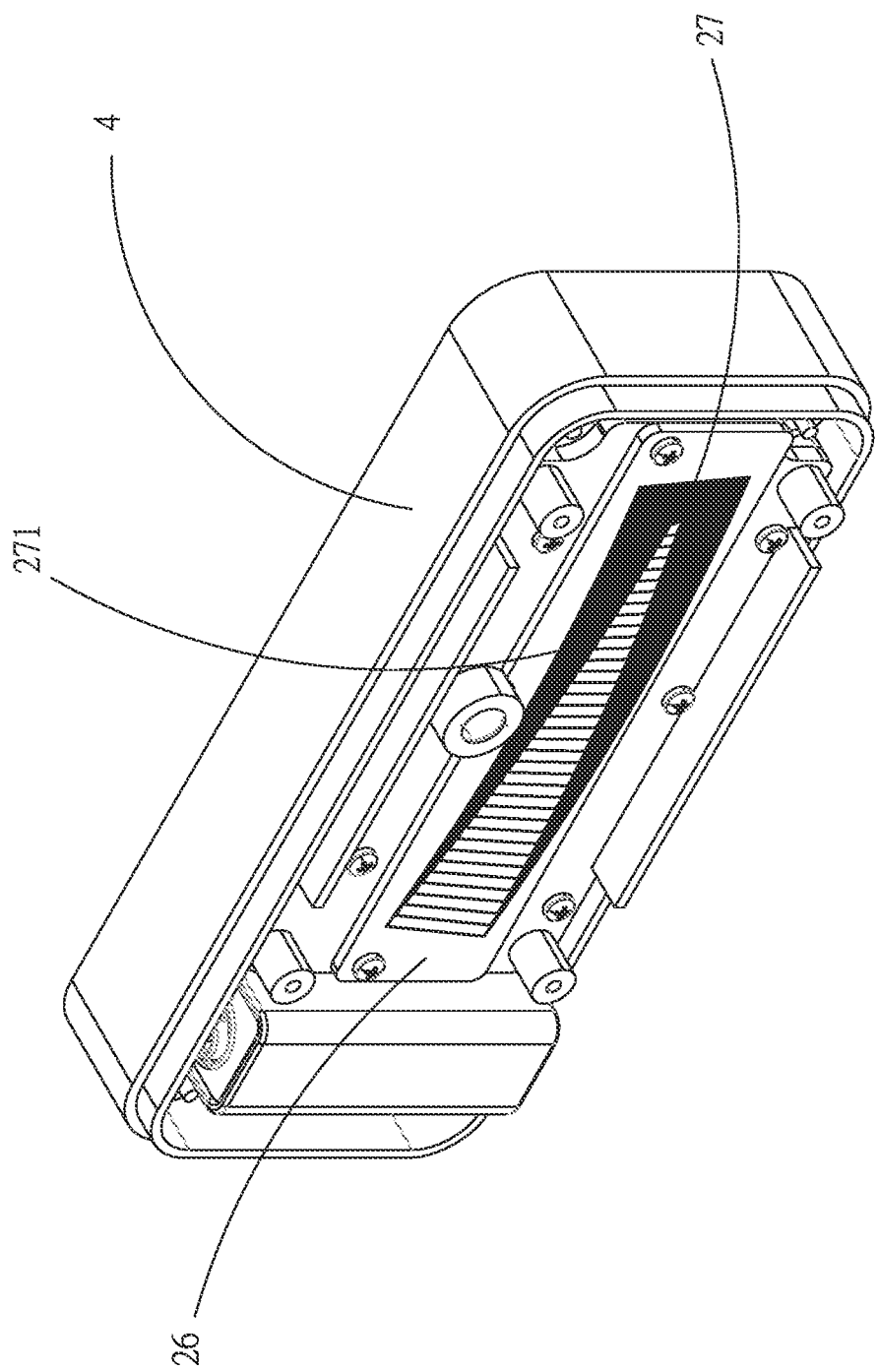
FIG. 4 is a first partial assembly view of the electromagnetic angle sensing structure of the invention.
Figure 5:
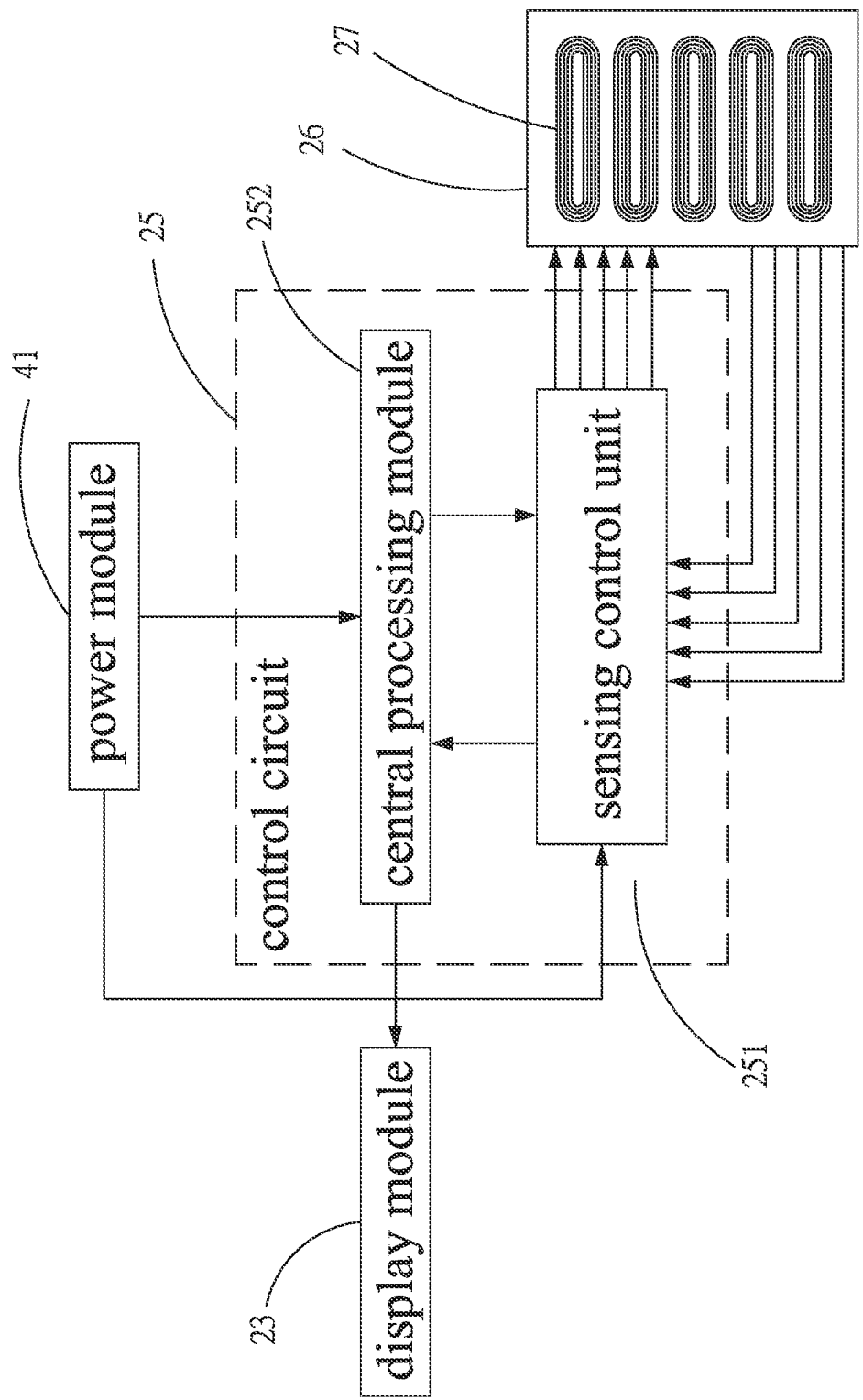
FIG. 5 is a second partial block diagram of the electromagnetic angle sensing structure of the invention.
Figure 6:
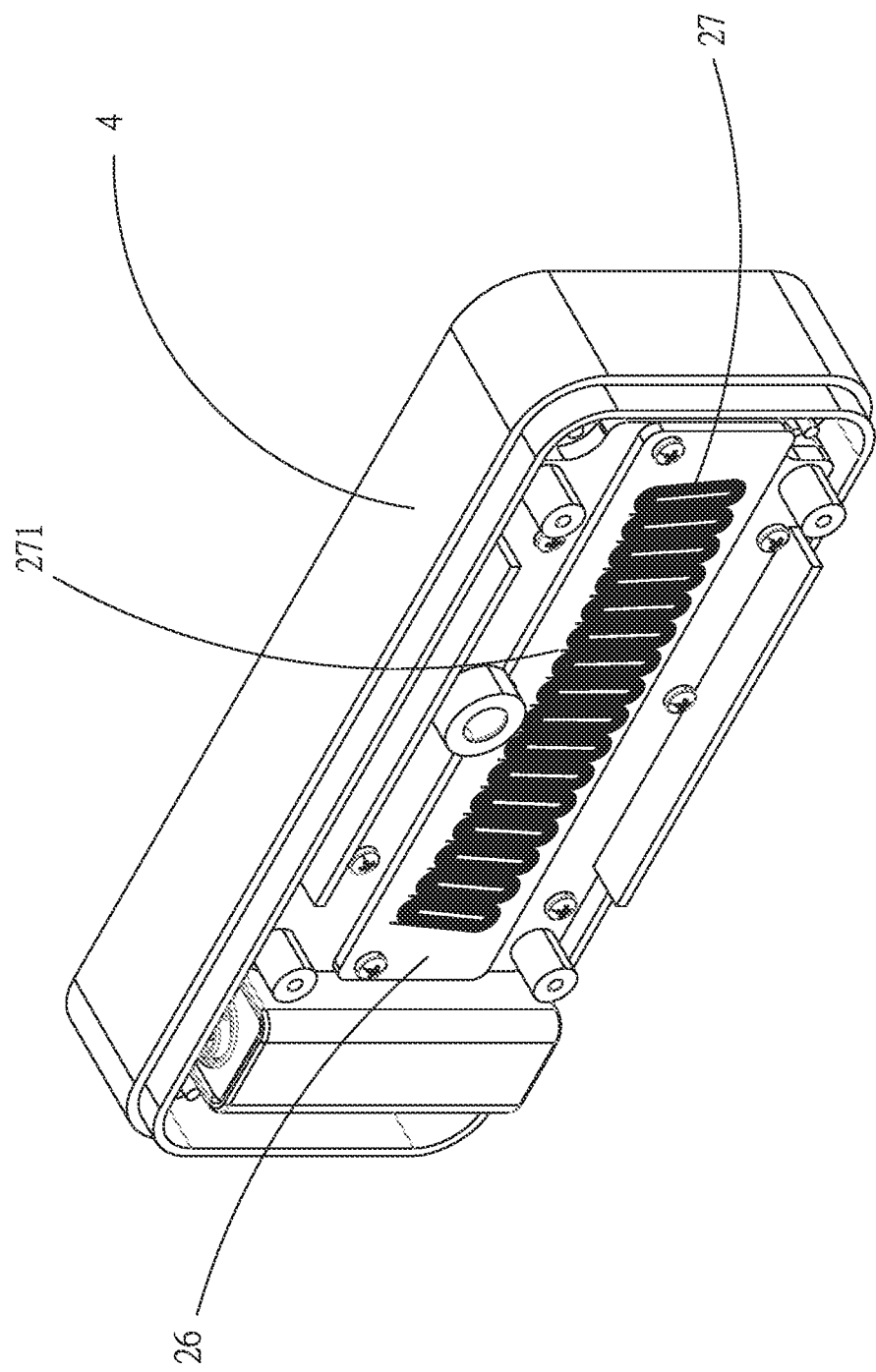
FIG. 6 is a second partial assembly view of the electromagnetic angle sensing structure of the invention.

Please refer to FIG. 4 for a first partial assembly view of the electromagnetic angle sensing structure 1 of the invention together with the aforementioned figures. In this embodiment, the sensing module 26 is implemented as being provided with the single sensing coil 27, the single sensing coil 27 is disposed with the coil being laid out in an expanding way, a width of the metal ball 34 strides across two loops of the sensing coil 27, and with the sensing module 26 being provided with the single sensing coil 27, the control circuit 25 does not require the use of a multiplexer. Wherein, a sensing structure the same as the electromagnetic angle sensing structure 1, or the assembled electromagnetic angle sensing structure 1 can be used to test an electromagnetic variable quantity generated by a known angular plane. For example, when the electromagnetic angle sensing structure 1 is placed on a plane with an inclination angle of 5 degrees, the metal ball 34 will move in the curvature guide rail 31, and an electromagnetic field intensity generated by the sensing coil 27 changes due to proximity of the metal ball 34, so that an inductance value of the sensing coil 27 is reduced or increased. The sensing control unit 251 generates the electromagnetic variable quantity through changes in the inductance value, and therefore the electromagnetic variable quantity of the inclination angle of 5 degrees can be obtained. Or when the electromagnetic angle sensing structure 1 is placed on a plane with an inclination angle of 10 degrees, the metal ball 34 will move in the curvature guide rail 31, and an electromagnetic field intensity generated by the sensing coil 27 changes due to proximity of the metal ball 34, so that an inductance value detected by the sensing coil 27 is reduced or increased. The sensing control unit 251 generates the electromagnetic variable quantity through changes in the inductance value, the electromagnetic variable quantities generated with the known angles are defined as a test angle value (X) and a test electromagnetic quantity value (Y) respectively, and a correspondence table is established. The correspondence table can be that the test angle value being 0 degree, the test electromagnetic quantity value being 0; the test angle value being 5 degrees, the test electromagnetic quantity value being 50; the test angle value being 10 degrees, the test electromagnetic quantity value being 100; the test angle value being 15 degrees, the test electromagnetic quantity value being 150; the test angle value being 20 degrees, the test electromagnetic quantity value being 200; and the test angle value being 25 degrees, the test electromagnetic quantity value being 250. Then, the correspondence tables established with the test angle values and the test electromagnetic quantity values are transmitted to the central processing module 252 to establish the angle data.

Wherein, when the angle data is established in the central processing module 252, the electromagnetic angle sensing structure 1 is capable of detecting angle on a plane with an unknown inclination angle. When the electromagnetic angle sensing structure 1 is placed on a surface to be measured for horizontal angle sensing, the electromagnetic angle sensing structure 1 will tilt due to an horizontal angle of the surface to be sensed, and the metal ball 34 in the curvature guide rail 31 will move according to its trajectory. The liquid in the curvature guide rail 31 is capable of restraining the metal ball 34 from oscillating rapidly while moving or stopping. When the liquid in the curvature guide rail 31 needs to be replenished, the leak-proof element 353 can be removed, the liquid can be filled from the liquid injection hole 352, the liquid enters the liquid injection passage 32 through the liquid injection hole 352, and then the liquid can be filled in the curvature guide rail 31. When the metal ball 34 moves in the curvature guide rail 31, an electromagnetic field intensity generated by the sensing coil 27 changes due to proximity of the metal ball 34, so that an inductance value detected by the sensing coil 27 is reduced or increased. The sensing control unit 251 generates the electromagnetic variable quantity through changes in the inductance value, the sensing control unit 251 transmits the electromagnetic variable quantity to the central processing module 252, the central processing module 252 receives the electromagnetic variable quantity, and the central processing module 252 compares the electromagnetic variable quantity with the test electromagnetic quantity values of the angle data. If the electromagnetic variable quantity is equivalent to a certain test electromagnetic quantity value, the central processing module 252 reads the corresponding test angle value, and then converts the test angle value into an angle information and displays the angle information on the display module 23. Alternatively, the central processing module 252 can also use a segment interpolation method or according to a relation corresponding to the test angle value (X) and the test electromagnetic quantity value (Y) to determine the test angle value corresponding to the electromagnetic variable quantity, thereby achieving an efficacy of directly displaying a converted value with high precision and not being affected by temperature.

Wherein the angle relation is calculated from the test angle values (X) and the test electromagnetic quantity values (Y) corresponding to one another, and the angle relation can be a linear equation or a nonlinear equation. When the angle relation is calculated from the angle data, and the angle data is established in the central processing module 252, the electromagnetic angle sensing structure 1 is capable of detecting angle on a plane with an unknown inclination angle. When the electromagnetic angle sensing structure 1 is placed on a plane to be measured, and the metal ball 34 moves in the curvature guide rail 31, an electromagnetic field intensity generated by the sensing coil 27 changes due to proximity of the metal ball 34, so that an inductance value of the sensing coil 27 is reduced or increased. The sensing control unit 251 generates the electromagnetic variable quantity through changes in the inductance value, the sensing control unit 251 transmits the electromagnetic variable quantity to the central processing module 252, and the central processing module 252 receives the electromagnetic variable quantity. The central processing module 252 calculates an inclination angle from the received electromagnetic variable quantity by using the angle relation, and the central processing module 252 converts the calculated inclination angle into the angle information and displays the angle information on the display module 23, thereby achieving an efficacy of directly displaying a converted value with high precision and not being affected by temperature.

Then please refer to FIGS. 4 to 8 at the same time respectively for a first partial assembly view, a second partial block diagram, a second partial assembly view, a first implementation diagram, and a second implementation diagram of the electromagnetic angle sensing structure 1 of the invention. In this embodiment, the sensing module 26 is provided with the sensing coils 27 spaced apart from one another and disposed at a specific angle. For example, the sensing module 26 is provided with the nine sensing coils 27, and sixteen position interpolated points spaced apart with a same distance are defined between the adjacent sensing coils 27 on the sensing module 26, so a position interpolated point value of the sensing coil 27 on the far left is 0, and position interpolated point values of the sensing coils 27 sequentially to the right are respectively 16, 32, 48, 64, 80, 96, 112, 128.

Figure 7:
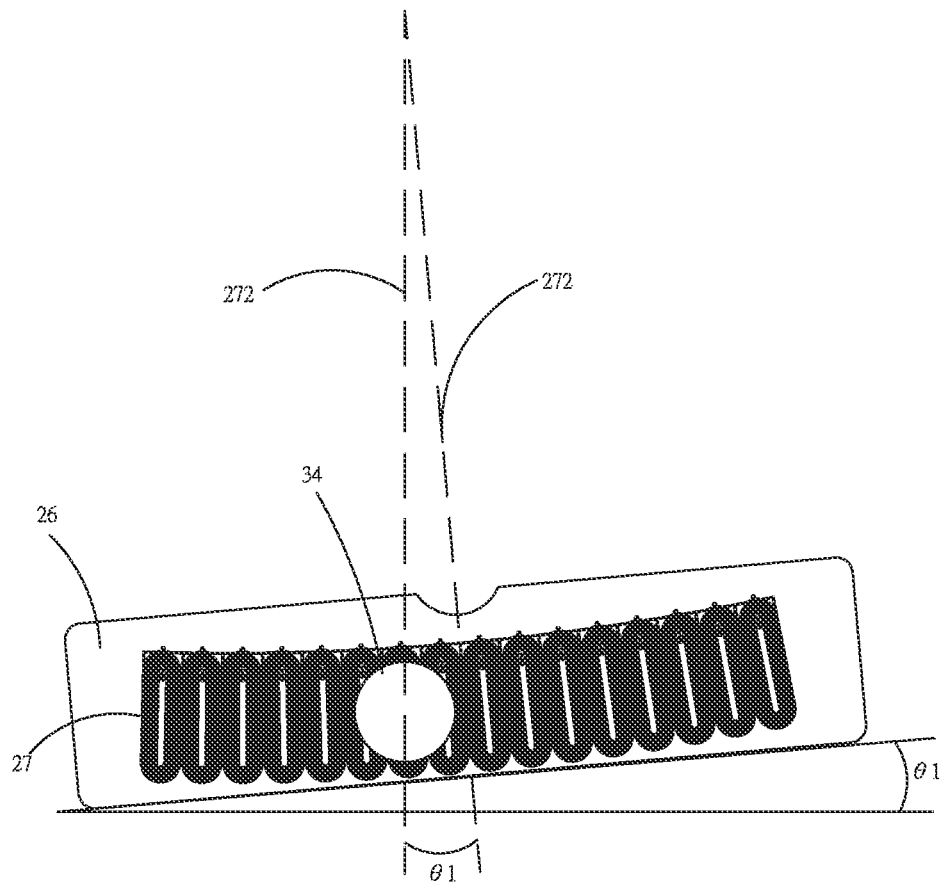
FIG. 7 is a first implementation diagram of the electromagnetic angle sensing structure of the invention.
Figure 8:
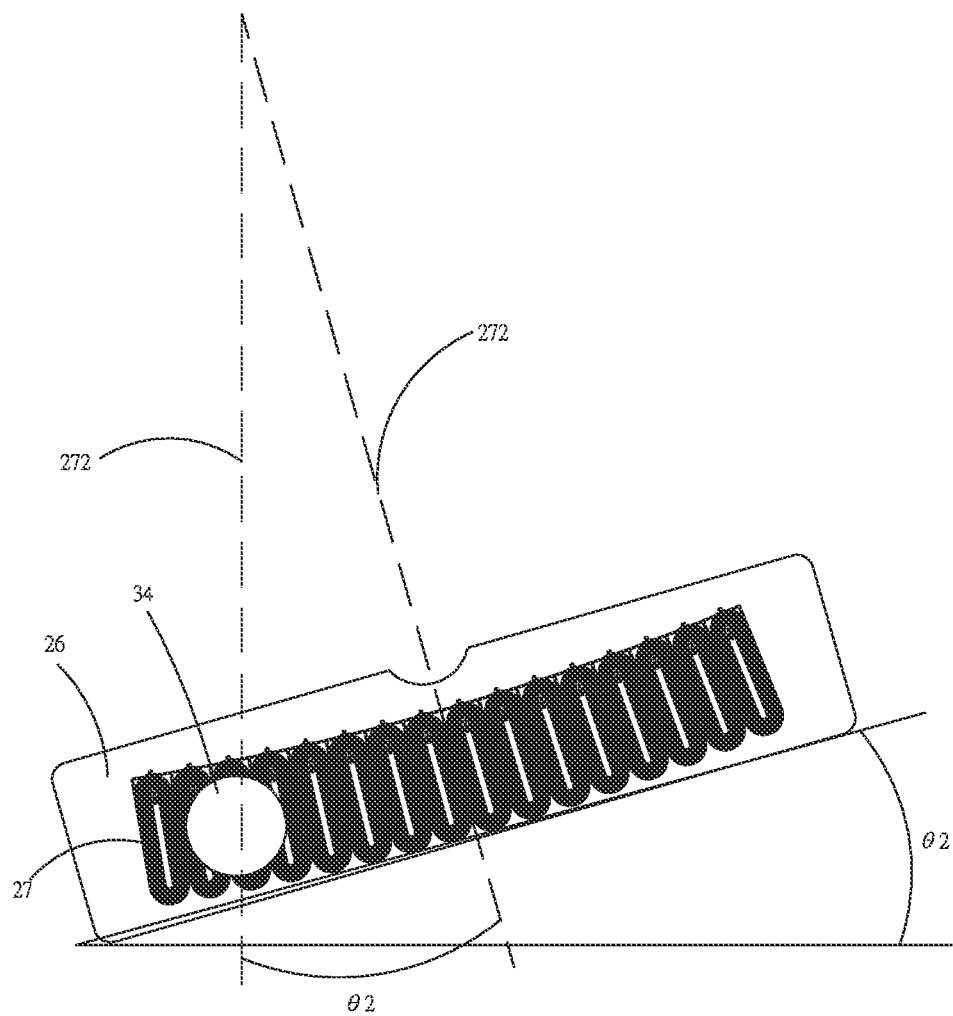
FIG. 8 is a second implementation diagram of the electromagnetic angle sensing structure of the invention.

The sensing coils 27 are presented according to a curvature trajectory manner, so the sensing coils 27 are disposed to expand outwardly in a slope manner, and an angle formed by junction between a center line of each of the sensing coils 27 and a center line of the sensing module 26 is equivalent to a slope of the electromagnetic angle sensing structure 1. The angle data comprises a plurality of coil angle values, a plurality of interpolated angle values, and a position relation, the position relation can be a conic equation or a quadratic function. As shown in FIG. 7, in the electromagnetic angle sensing structure 1, an angle θ1 formed by junction between a vertical line of a center point of one of the sensing coils 27 and the center line of the sensing module 26 is a coil angle value, the coil angle value is equivalent to the inclination angle θ1 of the plane, and a position of the vertical line of the center point of the sensing coil 27 is equivalent to the center point of the sensing coil 27 at which the metal ball 34 stops. Or as shown in FIG. 8, in the electromagnetic angle sensing structure 1, an angle θ2 formed by junction between a vertical line of a center point of the other sensing coil 27 and the center line of the sensing module 26 is a coil angle value, the coil angle value is equivalent to the inclination angle θ2 of the plane, and a position of the vertical line of the center point of the sensing coil 27 is equivalent to the center point of the sensing coil 27 at which the metal ball 34 stops. Therefore, the coil angle value of each of the sensing coils 27 is set according to a curvature of the curvature guide rail 31, and the coil angle value of each of the sensing coils 27 is a known angle value.

In addition, the interpolated angle values are angles formed by junction between position interpolated point extension lines 272 between the two adjacent sensing coils 27 and the center line of the sensing module 26. For example, the sensing module 26 is provided with the nine sensing coils 27, and sixteen position interpolated points spaced apart with a same distance are defined between the adjacent sensing coils 27, that is, the sensing module 26 has 16×(9−1)=128 position interpolated points, and an angle formed by junction between each of the position interpolated point extension lines 272 and the center line of the sensing module 26 is a position interpolated angle value, wherein the coil angle value is a known angle value, so the position interpolated angle value is also a known angle value.

Therefore, when the electromagnetic angle sensing structure 1 is used to detect an angle on a plane with an unknown inclination angle, the electromagnetic angle sensing structure 1 is placed on a plane to be measured, the metal ball 34 will move in the curvature guide rail 31, and an electromagnetic field intensity generated by the sensing coil 27 changes due to proximity of the metal ball 34, so that an inductance value of the sensing coil 27 is reduced or increased. The sensing control unit 251 generates the electromagnetic variable quantity through changes in the inductance value, the central processing module 252 determines a position interpolated point from the electromagnetic variable quantity by using the position relation, the central processing module 252 reads an interpolated angle value of the position interpolated point, and then converts the interpolated angle value into the angle information and displays the angle information on the display module 23, thereby achieving an efficacy of directly displaying a converted value with high precision and not being affected by temperature.

Figure 9:
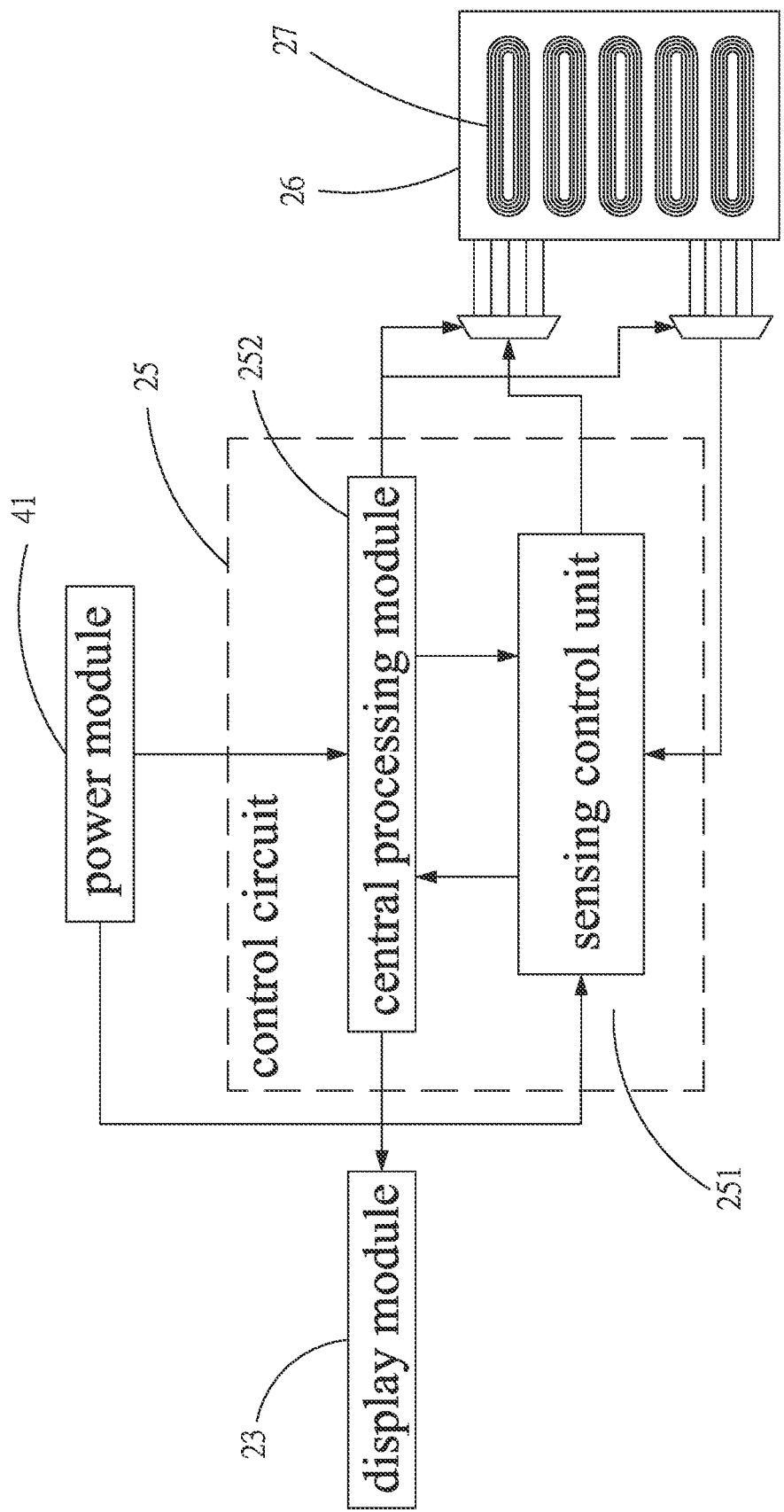
FIG. 9 is a third partial block diagram of the electromagnetic angle sensing structure of the invention.

Please refer to the aforementioned figures together with FIG. 9 for a third partial block diagram of the electromagnetic angle sensing structure 1 of the invention. In this embodiment, the sensing module 26 is provided with the sensing coils 27 spaced apart from one another. The control circuit 25 is provided with the central processing module 252 and the sensing control unit 251, and the sensing control unit 251 can have a built-in multiplexer, or the sensing control unit 251 can also be electrically connected to the sensing module 26 through at least one multiplexer. In a mode of additionally provided with the multiplexer, the sensing control unit 251 is electrically connected to the sensing module 26 through the multiplexer, and the central processing module 252 can also be electrically connected to the sensing module 26 through the multiplexer.

It is to be understood that the above description is only the preferred embodiments of the present invention and is not used to limit the present invention, and changes in accordance with the concepts of the present invention may be made without departing from the spirit of the present invention, for example, the equivalent effects produced by various transformations, variations, modifications and applications made to the configurations or arrangements shall still fall within the scope covered by the appended claims of the present invention.

What is claimed is:

1. An electromagnetic angle sensing structure comprising:
a front cover, the front cover having at least one display through hole and a display module being disposed at a position of the display through hole, the display module being electrically connected to a control circuit with a sensing module, the sensing module being provided with a sensing area formed by at least one sensing coil, the control circuit comprising a sensing control unit capable of generating an electromagnetic variable quantity and a central processing module receiving the electromagnetic variable quantity, the central processing module storing an angle data;
an inner assembly body, a front side of the inner assembly body being formed with a curvature guide rail with a shape the same as that of the sensing area, the curvature guide rail being filled with a liquid and disposed with a metal ball, an inner plate being provided on the front side of the inner assembly body to shield the curvature guide rail, so that when the metal ball being displaced in the curvature guide rail, an electromagnetic field generated by the sensing coil generating changes in an inductance value due to the metal ball passing through, the sensing control unit generating the electromagnetic variable quantity through changes in the inductance value and transmitting the electromagnetic variable quantity to the central processing module, and an angle information converted by the central processing module through the electromagnetic variable quantity and the angle data being displayed on the display module; and
a rear cover, the rear cover and the front cover being assembled with each other, and the inner assembly body being disposed in the rear cover.

2. The electromagnetic angle sensing structure as claimed in claim 1, further comprising a button module, the button module being disposed in the front cover and electrically connected to the control circuit, and the front cover being formed with at least one button through hole at a position of the button module to communicate with the button module.

3. The electromagnetic angle sensing structure as claimed in claim 1, further comprising a power module, the power module being disposed in the rear cover and electrically connected to the control circuit.

4. The electromagnetic angle sensing structure as claimed in claim 1, further comprising a liquid injection passage, the liquid injection passage being formed on the inner assembly body and communicated with the curvature guide rail.

5. The electromagnetic angle sensing structure as claimed in claim 4, further comprising a liquid injection hole, the liquid injection hole being formed on the inner plate and communicated with the liquid injection passage.

6. The electromagnetic angle sensing structure as claimed in claim 5, further comprising a leak-proof element, the leak-proof element being assembled with the liquid injection hole and sealing the liquid injection hole.

7. The electromagnetic angle sensing structure as claimed in claim 1, further comprising a sealing passage, the sealing passage being formed on the front side of the inner assembly body, and a sealing member being disposed in the sealing passage to attach on the inner plate.

8. The electromagnetic angle sensing structure as claimed in claim 1, wherein the angle data comprises a plurality of test angle values and a plurality of test electromagnetic quantity values corresponding to one another, the central processing module obtains the corresponding test angle value by comparing the electromagnetic variable quantity with the test electromagnetic quantity values, and the central processing module converts the test angle value into the angle information and displays the angle information on the display module.

9. The electromagnetic angle sensing structure as claimed in claim 1, wherein the angle data further comprises an angle relation, and the angle information calculated through the electromagnetic variable quantity received by the central processing module by using the angle relation is displayed on the display module.

10. The electromagnetic angle sensing structure as claimed in claim 1, wherein the angle data comprises a plurality of coil angle values, a plurality of interpolated angle values, and a position relation.

11. The electromagnetic angle sensing structure as claimed in claim 1, further comprising at least one assembling hole, the assembling hole being formed on the front side of the inner assembly body, at least one plate through hole being formed on the inner plate to communicate with the assembling hole, and the plate through hole and the assembling hole being locked with each other by at least one locking element.

* * * * *